(12) United States Patent
Touraud et al.

(10) Patent No.: US 8,952,122 B2
(45) Date of Patent: Feb. 10, 2015

(54) MODIFIED POLYAMIDE, PREPARATION METHOD THEREOF AND ARTICLE OBTAINED FROM SAID POLYAMIDE

(75) Inventors: Franck Touraud, Eyzin Pinet (FR); Stéphane Jeol, Lyons (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 13/382,040

(22) PCT Filed: Jun. 24, 2010

(86) PCT No.: PCT/EP2010/058978
§ 371 (c)(1),
(2), (4) Date: Mar. 20, 2012

(87) PCT Pub. No.: WO2011/000764
PCT Pub. Date: Jan. 6, 2011

(65) Prior Publication Data
US 2012/0172538 A1    Jul. 5, 2012

(30) Foreign Application Priority Data
Jul. 3, 2009   (FR) ..................... 09 54568

(51) Int. Cl.
| | | |
|---|---|---|
| *C08G 69/00* | (2006.01) | |
| *C08G 69/42* | (2006.01) | |
| *C08L 77/00* | (2006.01) | |
| *C08L 101/00* | (2006.01) | |

(52) U.S. Cl.
CPC .............. *C08G 69/42* (2013.01); *C08L 77/00* (2013.01); *C08L 101/00* (2013.01)
USPC ........... 528/337; 525/420; 525/535; 528/288; 528/290; 528/335; 528/347; 528/360

(58) Field of Classification Search
USPC ............ 525/52, 418, 420, 535; 524/591, 606; 528/288, 290, 335, 337, 347, 360
See application file for complete search history.

(56) References Cited

U.S. PATENT DOCUMENTS

| | | | |
|---|---|---|---|
| 3,654,237 A | | 4/1972 | Kosel et al. |
| 3,846,507 A | * | 11/1974 | Thomm et al. ................. 525/432 |
| 3,951,923 A | | 4/1976 | Cleary |
| 4,801,502 A | | 1/1989 | Weinrotter et al. |
| 5,095,070 A | | 3/1992 | Barthelemy |
| 5,468,554 A | * | 11/1995 | Windley ........................ 428/357 |
| 5,959,069 A | | 9/1999 | Gluck et al. |
| 6,037,421 A | | 3/2000 | Asrar |
| 6,525,166 B1 | | 2/2003 | Di Silvestro et al. |
| 6,867,256 B1 | | 3/2005 | Di Silvestro et al. |
| 6,872,800 B1 | | 3/2005 | Bouquerel et al. |

FOREIGN PATENT DOCUMENTS

| | | | |
|---|---|---|---|
| EP | 0119185 A2 | | 9/1984 |
| EP | 0360707 A1 | | 3/1990 |
| EP | 0632703 | | 1/1995 |
| EP | 0682057 A1 | | 11/1995 |
| EP | 0832149 | | 4/1998 |
| FR | 2743077 A1 | | 7/1997 |
| FR | 2779730 A1 | | 12/1999 |
| GB | 1161411 | * | 8/1969 |
| GB | 1161411 A | | 8/1969 |
| WO | WO 99/03909 A1 | | 1/1999 |
| WO | WO 00/68298 A1 | | 11/2000 |

OTHER PUBLICATIONS

International Search Report (PCT/ISA/210) issued on Jul. 27, 2010, by European Patent Office as the International Searching Authority for International Application No. PCT/EP2010/058978.

\* cited by examiner

*Primary Examiner* — Robert Jones, Jr.
(74) *Attorney, Agent, or Firm* — Dentons US LLP

(57) ABSTRACT

A polyamide modified by a compound including a sulfonate group, as well as a method for preparing the polyamide and to articles obtained from said modified polyamide are described. A modified polyamide obtained from a monofunctional aromatic sulfonate compound is also described.

12 Claims, No Drawings

MODIFIED POLYAMIDE, PREPARATION METHOD THEREOF AND ARTICLE OBTAINED FROM SAID POLYAMIDE

This application is the United States national phase of PCT/EP2010/058978, filed Jun. 24, 2010, and designating the United States (published in the French language on Jan. 6, 2011, as WO 2011/000764 A1; the title and abstract were also published in English) and claims priority under 35 U.S.C. §119 of FR 0954568, filed Jul. 3, 2009, each hereby expressly incorporated by reference in its entirety and each assigned to the assignee hereof.

The present invention relates to a polyamide modified by a compound containing a sulfonate group, as well as a method for preparation of that polyamide, and to articles obtained from that modified polyamide.

More particularly, the invention relates to a modified polyamide obtained from a monofunctional aromatic sulfonate compound in particular.

Thermoplastic polymers are raw materials which can be transformed by molding, injection molding, blow-molding injection, extrusion/blow-molding, spinning or film production in particular into many articles such as blow-molded, extruded or molded components (for example for automobiles or electronics), yarns, fibers or films, etc.

There are at least two major constraints in all these procedures for transformation of thermoplastic polymers.

The first of these constraints is that the thermoplastic polymers used must be characterized, in the melted state, by a viscosity or a rheological behavior compatible with the aforesaid forming processes. These thermoplastic polymers must be sufficiently fluid when they are in the melted state to be able to be easily and rapidly conveyed and manipulated in certain forming machines such as in particular injection presses. It is known in the prior art that a decrease in the viscosity of thermoplastic polymers in the melted state can be obtained by a decrease in their molar mass, which has the effect of facilitating their mixing with various agents and/or their utilization.

The other constraint with which thermoplastic polymer compositions are burdened is connected with the mechanical properties which they must display after having been melted, shaped and hardened by cooling. These mechanical properties are in particular the thermomechanical properties. It is known in the prior art that a reduction in the molar mass of a thermoplastic polymer is accompanied by a decline in the thermomechanical and mechanical properties.

Among the thermoplastic polymers, the polyamides are polymers which are of major industrial and commercial interest, in particular the aliphatic polyamides. These aliphatic polyamides are easily synthesizable and transformable in the melted state. However, there are continual efforts to improve their mechanical, in particular thermomechanical properties, while preserving a certain ease of use by the usual transformation techniques mentioned above.

Various factors are used to modulate the properties of these polyamides, such as the composition, structure, use of additives, etc. Those skilled in the art seek to obtain different balances of properties, combining at the same time good processability (fluidity), while preserving satisfactory application properties such as for example, mechanical performance, dimensional stability, low water absorption, a barrier effect towards gas or gasoline, etc.

Surprisingly, the applicant has developed a polyamide modified by a monofunctional sulfonate compound which exhibits this balance of properties. In particular, it is observed that it is possible to reduce the molecular mass of a polyamide by the addition of a monofunctional sulfonate compound and therefore thus to increase its melt viscosity without however diminishing, or even on the contrary increasing, the thermomechanical and mechanical properties.

Thus, the invention proposes, in a first subject, a polyamide modified by a compound containing a sulfonate group and being chemically bonded to the polymer chain, the polyamide containing at least one unit containing a sulfonate group, of the following formula (I):

wherein:
$SO_3X$ represents $SO_3H$ or $SO_3M$, M being a group which replaces the $SO_3H$ proton to form an inactive salified group
-L-Z— is a radical derived from the condensation of two reactive functional groups $F_1$ and $F_2$ such that
$F_1$ is the precursor of the radical -L- and $F_2$ the precursor of the radical —Z—,
A is a covalent bond or an aliphatic hydrocarbon radical capable of containing hetero atoms and containing from 1 to 20 carbon atoms.
Y is a linear or cyclic, aromatic or aliphatic hydrocarbon radical containing at least 2 carbon atoms and capable of containing hetero atoms,
said units being present in a proportion at least equal to 3 mole %, preferably at least equal to 5 mole %, relative to the total number of moles of constituent units of the polymer chain.

According to a second subject, the invention proposes a method for preparation of the above modified polyamide, by introduction of a monofunctional compound containing a sulfonate group into the reaction medium in the melted state.

Finally, according to a third subject, the invention proposes a composition containing this modified polyamide and an article obtained by shaping the above modified polyamide.

The invention first of all relates to a polyamide modified by a compound containing a sulfonate group and being chemically bonded to the polymer chain.

"Chemically bonded" is understood to mean bonded by a covalent bond.

The modified polyamide of the invention contains at least one unit containing a sulfonate group, of the following formula (I):

wherein:
$SO_3X$ represents $SO_3H$ or $SO_3M$, M being a group which replaces the $SO_3H$ proton to form an inactive salified group
-L-Z— is a radical derived from the condensation of two reactive functional groups $F_1$ and $F_2$ such that
$F_1$ is the precursor of the radical -L- and $F_2$ the precursor of the radical —Z—,
A is a covalent bond or an aliphatic hydrocarbon radical capable of containing hetero atoms and containing from 1 to 20 carbon atoms.
Y is a linear or cyclic, aromatic or aliphatic hydrocarbon radical containing at least 2 carbon atoms and capable of containing hetero atoms.

These sulfonate groups are capable of interacting by non-covalent but high energy bonds (H and/or ionic and/or metal complexation bonds in particular) with one or more components of the polyamide such as residual amine and acid functional groups at chain ends, central amide functional groups, other sulfonate groups or also with other components present in the polyamide (hetero atoms such as for example hydroxyl, ether, secondary or tertiary amine functional groups, etc.). By these interactions, these sulfonate groups make it possible to augment the mechanical and in particular thermomechanical properties of the polyamide.

$F_1$ is advantageously an acid functional group or an amine functional group or derivatives thereof. "Acid functional group" is understood to mean in particular a carboxylic acid functional group or derivative, such as acid chloride, acid anhydride, amide or ester.

$F_2$ is advantageously a functional group reactive towards an acid, amine or derived functional group. $F_2$ is preferably selected from -Hal (Hal signifies halogen), —COHal, —COOR, anhydride, —CONRR', —CO—R, —NRR', —N=C=O, —OR, —NR—CO—NR'R'', —O—CO—OR, —O—CO—NRR', —NR—CO—OR', —SR, R, R' and R'', the same or different, being a hydrogen atom or a linear or branched alkyl radical containing from 1 to 18 carbon atoms.

Advantageously the radical Y is an aromatic radical.

According to a particular embodiment of the invention, —Z— is a group selected from —NR—, —O— and —CO—, =CH—R—, —CO—O—, —CO—NH—, R being hydrogen or an alkyl radical with 1 to 18 carbon atoms, preferably between 1 and 4 carbon atoms.

"Inactive" salified group is understood to mean a salified group which does not react with amine functional groups or acid functional groups, in particular with the amine and acid functional groups of the monomers from which the polyamide of the invention is derived.

M can in particular be selected from the alkali metals (including in particular Li, Na, K and Cs), the alkaline earth metals (including in particular Ca, Mg and Ba), the transition metals (including in particular Ti, Zr, Cr, Mn, Fe, Co, Ni, Cu, Zn and Ag), the poor metals (including in particular Al, Pb, Sn and Ga), the metalloids (including in particular Sb, Ge and Si), the rare earths and any other type of cation such as ammonium $NH_4^+$, etc.

M is advantageously an alkali metal, preferably sodium or lithium, an alkaline earth metal preferably calcium or magnesium, or a metal selected from copper, zinc or aluminum.

According to a particular embodiment of the invention, -L-Z— is —NH—CO— or —CO—NH—.

Advantageously the unit -L-Z-A-Y—$SO_3X$ is an aromatic mono-sulfonate unit.

"Aromatic sulfonate unit" is understood to mean a unit containing an aromatic sulfonate group.

According to a particular embodiment of the invention, the modified polyamide is obtained by using a monofunctional aromatic compound of the following formula (II):

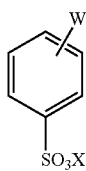

(II)

wherein:
$SO_3X$ represents $SO_3H$ or $SO_3M$, M being a group which replaces the $SO_3H$ proton to form an inactive salified group
—W being -A-$F_2$ with A as defined above and $F_2$ being a functional group reactive towards an acid, amine or derived functional group, $F_2$ preferably being selected from -Hal (Hal signifies halogen), —COHal, —COOR, anhydride, —CONRR', —CO—R, —NRR', —N=C=O, —OR, —NR—CO—NR'R'', —O—CO—OR, —O—CO—NRR', —NR—CO—OR', —SR, R, R' and R'', the same or different, being a hydrogen atom or a linear or branched alkyl radical containing from 1 to 18 carbon atoms.

As examples of monofunctional aromatic sulfonate compounds, sodium-4-carboxybenzenesulfonate, sodium-3-carboxybenzenesulfonate, sodium-2-carboxybenzenesulfonate, lithium-3-carboxybenzenesulfonate, potassium-3-carboxybenzenesulfonate, sodium-3-carbomethoxybenzenesulfonate, potassium-2-carbopropoxybenzenesulfonate, sodium-2-carbomethoxyethylbenzenesulfonate, potassium-3-aminomethylbenzenesulfonate, sodium-2-aminoethylbenzenesulfonate and potassium-3-aminopropylbenzenesulfonate may be cited.

Advantageously the monofunctional aromatic compound is sodium-3-carboxybenzenesulfonate.

When —$F_2$ is —CHO, the monofunctional aromatic compound can for example be an alkali metal (in particular Li) salt of 2-formylbenzene-1-sulfonic acid.

The thermoplastic polyamides are obtained either by reaction between two different monomers, or by polycondensation of a single monomer. On the one hand, the invention applies to polyamides derived from two different monomers, among which the most important polyamide is poly(hexamethylene adipamide). Of course, these polyamides can be obtained from a mixture of diacids and diamines. Thus, in the case of poly(hexamethylene adipamide), the principal monomers are hexamethylenediamine and adipic acid. However, these monomers can include other diamine or diacid monomers or even amino acid or lactam monomers.

On the other hand, the invention applies to polyamides derived from a single monomer, among which the most important polyamide is polycaprolactam. Of course, these polyamides can be obtained from a mixture of lactams and/or amino acids. Thus, in the case of polycaprolactam, the principal monomer is caprolactam. However, these monomers can include other amino acid or lactam monomers or even diamine or diacid monomers.

The diacids from which the dicarboxylic acid units of the polyamide of the invention are derived can be saturated or unsaturated, linear or branched aliphatic, cycloaliphatic, arylaliphatic or aromatic diacids, which may or may not contain hetero atoms.

Arylaliphatic diacid is understood to mean a diacid at least one of the acid functional groups whereof is not attached to a carbon atom forming part of an aromatic ring.

According to a particular embodiment of the method of the invention, the diacid is an aliphatic diacid. The aliphatic acid can for example be selected from oxalic, maleic, succinic, pimelic and azelaic acid. It can also contain unsaturations, which is for example the case with maleic or fumaric acid.

The dicarboxylic diacids can also be selected from succinic acid, glutaric acid, adipic acid, suberic acid, sebacic acid, dodecanedioic acid, brassylic acid, 1,2- or 1,3-cyclohexane dicarboxylic acid; 1,2- or 1,3-phenylene diacetic acid; 1,2- or 1,3-cyclohexane diacetic acid; isophthalic acid; terephthalic acid; 4,4'-benzophenone dicarboxylic acid; 2,5-naphthalene dicarboxylic acid and p-t-butyl isophthalic acid. The preferred dicarboxylic acid is adipic acid.

The carboxylic diacids can also contain functional groups unreactive towards polyamide functional groups.

In the context of the invention, mixtures of different diacids can be used.

The diamines from which diamine units of the polyamide of the invention are derived can be saturated or unsaturated, linear or branched aliphatic, cycloaliphatic, arylaliphatic or aromatic diamines, which may or may not contain hetero atoms. These diamines are preferably aliphatic.

Arylaliphatic diamine is understood to mean a diamine at least one of the amine functional groups whereof is not attached to a carbon atom forming part of an aromatic ring.

Suitable aliphatic diamines include straight-chain aliphatic diamines, such as 1,10-diaminodecane, branched chain aliphatic diamines, such as 2-methyl-1,6-diaminohexane, and cycloaliphatic diamines, such as the di(aminomethyl)cyclohexanediamines.

The aliphatic chain can contain hetero atoms such as sulfur or oxygen, as represented by 3,3'-ethylenedioxybis(propylamine), and it can also bear substituents such as halogen atoms, which do not react under the polymerization conditions. It can be of a polymeric nature, for example it can be a polyether or silicone chain, etc.

As examples of suitable arylaliphatic diamines in the context of the invention, meta-xylylene diamine or paraxylylene diamine may be cited.

The diamines can for example be selected from hexamethylenediamine; butanediamine, pentanediamine; 2-methylpentamethylenediamine; 2-methylhexamethylenediamine; 3-methylhexamethylenediamine; 2,5-dimethylhexamethylenediamine; 2,2-dimethylpentamethylenediamine; nonanediamine; 5-methylnonanediamine; dodecamethylenediamine; 2,2,4- and 2,4,4-trimethylhexamethylenediamine; 2,2,7,7-tetramethyloctamethylenediamine; isophoronediamine; diaminodicyclohexylmethane and the $C_2$-$C_{16}$ aliphatic diamines which can be substituted with one or more alkyl groups. The preferred diamine is hexamethylenediamine.

The diamines can also contain functional groups unreactive towards functional groups of the polyamide.

Mixtures of diamines can also be used in the present invention.

The lactams or amino acids from which the aminocarboxylic acid units of the modified polyamide of the invention are derived are preferably aliphatic, and may or may not contain hetero atoms, be linear or branched or saturated or unsaturated. The lactams or amino acids can also contain functional groups unreactive towards functional groups of the polyamide.

As examples of such lactams or amino acids, the caprolactam acid, 6-aminohexanoic acid, 5-aminopentanoic acid, 7-aminoheptanoic acid, amino-undecanoic acid and dodecanolactam may be cited.

In the context of the invention, mixtures of different lactams or amino acids can be utilized.

The modified polyamide of the invention contains at least one unit containing a sulfonate group as described above. This unit is present in a proportion at least equal to 3 mole % relative to the total number of moles of units constituting the polymeric chain, preferably at least 5 mole %. The units constituting the polymeric chain can be for example carboxylic diacid units, diamine units or aminocarboxylic acid units. In the sense of the invention, they do not include units containing a sulfonate group of the formula (I).

Preferably, the unit containing a sulfonate group is present in a proportion at least equal to 3 mole %, more preferably at least equal to 5 mole %, relative to the total number of moles of carboxylic diacid units or of diamine units, and/or of aminocarboxylic acid units in the polymeric chain.

In the case of the utilization of a diacid/diamine mixture, mole of carboxylic diacid unit or mole of diamine unit is understood to mean one mole of diacid and one mole of diamine utilized to prepare the polyamide, in other words is understood to mean one mole of the diacid/diamine salt utilized for the preparation of the polyamide. Mole of aminocarboxylic acid unit is understood to mean one mole of amino acid or one mole of lactam utilized to prepare the polyamide.

In the case of the utilization of a diamine/diacid mixture, if one of the two monomers (diacid or diamine) is utilized in excess relative to the other, the calculation of the molar proportion of unit containing a sulfonate group is performed relative to the number of moles of units derived from the monomer present in excess.

Advantageously this proportion is greater than or equal to 5%.

The invention also relates to a method for preparation of the modified polyamide described above, by introduction of a monofunctional compound containing a sulfonate group into the reaction medium.

The monofunctional compound containing a sulfonate group can be introduced at any time before, during or after the process of polymerization of the polyamide, by any method known to those skilled in the art.

It can be a method for preparation in the melted state, in solution, in the solid phase, by reactive extrusion, etc.

Advantageously the modified polyamide is prepared by introduction of a monofunctional compound containing a sulfonate group, the functional group whereof can react with an amine or acid functional group, into the reaction medium in the melted state.

The functional groups able to react with an amine functional group are in particular the acid, ketone, aldehyde, hydroxyl, halogen, isocyanate, carbonate or urea functional groups or derivatives thereof.

The sulfonate groups of the invention are not regarded as functional groups reacting chemically with the amine functional groups.

The sulfonate functional group may be attached to an aromatic, aliphatic or cycloaliphatic hydrocarbon radical. The hydrocarbon radical can for example be interrupted by ether, sulfide or sulfone groups. In particular, these can be alkylsulfonate, arylsulfonate, aryloxyalkylsulfonate, alkyloxyarylsulfonate or arylsulfonamidoalkylsulfonate salts. The interrupted or non-interrupted hydrocarbon radical contains a single functional group able to react with an amine or acid functional group. This functional group, in the case of an aromatic radical, may or may not be directly attached to the aromatic radical.

Advantageously the monofunctional compound containing a sulfonate group is a monofunctional aromatic compound.

All that has been described above concerning the units containing a sulfonate group, applies analogously here for the monofunctional compounds containing a sulfonate group.

In particular the invention relates to a method for preparation of the modified polyamide, by polymerization of the following monomers in the melted state:
  A) at least one monofunctional compound containing a sulfonate group, the functional group whereof can react with an amine or acid functional group
  B) at least one compound or a mixture of compounds selected from:
  B1) a mixture of diacid and diamine
  B2) a lactam or an amino acid
  the molar proportion of monomers A) relative to the monomers B) is at least equal to 3%, more preferably at least equal to 5%.

Multifunctional monomers containing at least three functional groups, the same or different, reactive towards the acid or amine functional groups, can also be utilized.

All that has been described above concerning the diacids, diamines, lactams and amino acids applies identically here for the monomers of the method of the invention.

Advantageously a stoichiometric proportion of acid functional groups and amine functional groups contributed by the monomers is introduced into the polymerization medium. This enables the obtention of a polymer of sufficient molecular mass to be utilized in different applications, and exhibiting the desired functionality.

The expression "polymerization in the melted state" is understood to mean that the polymerization is effected in the liquid state and that the polymerization medium contains no solvent other than water, possibly. The polymerization medium can for example be an aqueous solution containing the monomers, or a liquid containing the monomers.

Advantageously the polymerization medium contains water as a solvent. This facilitates the stirring of the medium and hence its homogeneity.

The polymerization medium can also contain additives such as non-functional chain limiters such as acetic acid, or functional ones.

The modified polyamide of the invention is generally obtained by polycondensation between the monomers A), and B), to form polyamide chains, with formation of the elimination product, in particular water, part of which may vaporize.

The modified polyamide of the invention is generally obtained, by heating at high temperature and pressure, for example of an aqueous solution containing the monomers, or of a liquid containing the monomers, to evaporate the elimination product, in particular water (present initially in the polymerization medium and/or formed during the polycondensation) while avoiding any formation of a solid phase in order to avoid solidification.

The polycondensation reaction is generally effected at a pressure of about 0.5-3.5 MPa (0.5-2.5 MPa) at a temperature of about 100-320° C. (180-300° C.). The polycondensation is generally conducted in the melted phase at atmospheric or reduced pressure so as to attain the desired progression level.

The polycondensation product is a melted polymer or prepolymer. It can include contain a vapor phase essentially consisting of vapor of the elimination product, in particular water, which may have been formed and/or vaporized.

This product can be subjected to vapor phase separation and finishing stages in order to attain the desired degree of polycondensation. The separation of the vapor phase can for example be performed in a device of the cyclone type. Such devices are known.

The finishing consists in maintaining the polycondensation product in the melted state, under a pressure close to atmospheric pressure or under reduced pressure, for a sufficient time to attain the desired progression level. Such an operation is known to those skilled in the art. The temperature of the finishing stage is advantageously greater than or equal to 100° C. and in all cases greater than the solidification temperature of the polymer. The residence time in the finishing device is preferably greater than or equal to 5 minutes.

The polycondensation product can also undergo a solid phase post-condensation stage. This stage is known to those skilled in the art and makes it possible to increase the degree of polycondensation to a desired value.

The conditions of the method of the invention are similar to those in the standard method for preparation of polyamide of the type obtained from dicarboxylic diacids and diamines, in particular in the method of production of polyamide 66 from adipic acid and hexamethylenediamine. This method for production of polyamide 66 is known to those skilled in the art.

The method for production of polyamide of the type obtained from dicarboxylic diacids and diamines generally uses as the starting material a salt obtained by mixing of a diacid with a diamine in stoichiometric quantity in general in a solvent such as water. Thus, in the production of poly(hexamethylene adipamide), adipic acid is mixed with hexamethylenediamine generally in water to obtain hexamethylene diammonium adipate better known under the name of Nylon salt, or "N salt".

Thus, when the method of the invention utilizes a diacid and a diamine, these compounds can be introduced, at least in part, in the form of a salt of diacid and diamine. In particular, when the diacid is adipic acid and the diamine hexamethylenediamine, these compounds can be introduced at least in part in the form of N salt. This makes it possible to have a stoichiometric equilibrium. Similarly, when compound A) is an acid, compound A) and the diamine can be introduced in salt form. This is also true when compound A) is an amine: compound A) and the diacid can be introduced in salt form.

The modified polyamide obtained at the end of the finishing stage can be cooled and made into granule form.

The modified polyamide obtained by the method of the invention in melted form may be shaped directly or be extruded and granulated, for subsequent shaping after melting.

The modified polyamide of the invention exhibits the advantage of being easily transformable when melted, like the aliphatic polyamides for example, which facilitates its shaping. In addition, it exhibits improved thermomechanical properties, for example it exhibits a higher glass transition temperature than the aliphatic polyamides.

The polyamide of the invention may be in the form of a composition based on the modified polyamide as matrix and containing additives such as reinforcing agents, fire retardants, UV and heat stabilizers, matting agents such as titanium dioxide, pigments, colorants, metal particles, etc.

The modified polyamide of the invention can be utilized as a starting material in the industrial plastics field, for example for the production of articles molded by injection or by injection/blow-molding, extruded by standard extrusion or by blow-molding extrusion, or of films or powders.

The modified polyamide of the invention can also be formed into yarns, fibers or filaments by melt spinning.

The polyamide of the invention can also be utilized as a component of a composition. It can in particular be utilized as an additive in thermoplastic polymer compositions containing a thermoplastic matrix. It participates in the composition in particular as a reinforcing agent. The thermoplastic matrix is a thermoplastic polymer.

As examples of polymers which can be suitable: polylactones such as poly(pivalolactone), poly(caprolactone) and polymers of the same family; polyurethanes obtained by reaction between diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and compounds of the same family and long-chain linear diols such as poly (tetramethylene adipate), poly(ethylene adipate), poly(1,4-butylene adipate), poly(ethylene succinate), poly(2,3-butylene succinate), polyether diols and compounds of the same family; polycarbonates such as poly[methane bis(4-phenyl)

carbonate], poly[1,1-ether bis(4-phenyl)carbonate], poly[diphenylmethane bis(4-phenyl)carbonate], poly[1,1-cyclohexane bis(4-phenyl)carbonate] and polymers of the same family; polysulfones; polyethers; polyketones; polyamides such as poly(4-aminobutyric acid), poly(hexamethylene adipamide), poly(6-aminohexanoic acid), poly(m-xylylene adipamide), poly(p-xylylene sebacamide), poly(2,2,2-trimethyl hexamethylene terephthalamide), poly(metaphenylene isophthalamide), poly(p-phenylene terephthalamide), and polymers of the same family; polyesters such as poly(ethylene azelate), poly(ethylene-1,5-naphthalate), poly(1,4-cyclohexanedimethylene terephthalate), poly(ethylene oxybenzoate), poly(parahydroxybenzoate), poly(1,4-cyclohexylidene dimethylene terephthalate), poly(1,4-cyclohexylidene dimethylene terephthalate), polyethylene terephthalate, polypropylene terephthalate, polybutylene terephthalate and polymers of the same family; poly(arylene oxides) such as poly(2,6-dimethyl-1,4-phenylene oxide), poly(2,6-diphenyl-1,4-phenylene oxide) and polymers of the same family; poly(arylene sulfides) such as poly(phenylene sulfide) and polymers of the same family; polyetherimides; vinylic polymers and copolymers thereof such as polyvinyl acetate, polyvinyl alcohol, polyvinyl chloride, polyvinyl butyral, polyvinylidene chloride, ethylene-vinyl acetate copolymers, and polymers of the same family; acrylic polymers, polyacrylates and copolymers thereof such as polyethyl acrylate, poly(n-butyl acrylate), polymethyl methacrylate, polyethyl methacrylate, poly(n-butyl methacrylate), poly(n-propyl methacrylate), polyacrylamide, polyacrylonitrile, poly(acrylic acid), ethylene-acrylic acid copolymers, ethylene-vinyl alcohol copolymers, copolymers of acrylonitrile, methyl methacrylate-styrene copolymers, ethylene-ethyl acrylate copolymers, methacrylate-butadiene-styrene copolymers, ABS, and polymers of the same family; polyolefins such as low density poly(ethylene), poly(propylene), low density chlorinated poly(ethylene), poly(4-methyl-1-pentene), poly(ethylene), poly(styrene), and polymers of the same family; ionomers; poly(epichloro-hydrins); poly(urethanes) such as products of polymerization of diols such as glycerin, trimethylol-propane, 1,2,6-hexanetriol, sorbitol, pentaerythritol, polyether polyols, polyester polyols and compounds of the same family with polyisocyanates such as 2,4-tolylene diisocyanate, 2,6-tolylene diisocyanate, 4,4'-diphenylmethane diisocyanate, 1,6-hexamethylene diisocyanate, 4,4'-dicyclohexylmethane diisocyanate and compounds of the same family; and polysulfones such as the products of reaction between a sodium salt of 2,2-bis(4-hydroxyphenyl)propane and 4,4'-dichlorodiphenyl sulfone; furan resins such as poly(furan); cellulose-ester plastics such as cellulose acetate, cellulose acetate-butyrate, cellulose propionate and polymers of the same family; silicones such as poly(dimethyl siloxane), poly(dimethyl siloxane co-phenylmethyl siloxane), and polymers of the same family; and mixtures of at least two of the above polymers are cited.

According to a particular embodiment of the invention, the thermoplastic matrix is a polymer containing star or H macromolecular chains, and if necessary linear macromolecular chains. Polymers containing such star or H macromolecular chains are for example described in the documents FR 2 743 077, FR 2 779 730, U.S. Pat. No. 5,959,069, EP 0 632 703, EP 0 682 057 and EP 0 832 149.

According to another particular embodiment of the invention, the thermoplastic matrix of the invention is a polymer of the random tree type, preferably a copolyamide exhibiting a random tree structure. These copoly-amides of random tree structure and their production method are in particular described in the document WO 99/03909.

The thermoplastic matrix of the invention can also be a composition containing a linear thermoplastic polymer and a star, H and/or tree thermoplastic polymer as described above.

The compositions of the invention can also contain a hyperbranched copolyamide of the type described in the document WO 00/68298.

The compositions of the invention can also contain any combination of star, H, tree thermoplastic polymer and hyperbranched copolyamide described above.

As another type of polymeric matrix capable of being utilized in the context of the invention, thermostable polymers may be cited: these polymers are preferably infusible or exhibit a softening point greater than 180° C., preferably ≥200° C., or above. These thermostable polymers can for example be selected from the aromatic polyamides, the imide polyamides such as polytrimellamide-imide, or polyimides such as the polyimides obtained according to the document EP 0119185, known in commerce under the brand P84. The aromatic polyamides can be such as described in the patent EP 0360707. They can be obtained according to the method described in the patent EP 0360707.

As another polymeric matrix, viscose, cellulose, cellulose acetate etc. can also be cited.

The polymeric matrix of the invention can also be of the same type as the polymers utilized in adhesives, such as plastisol copolymers of vinyl acetates, acrylic latexes, urethane latexes, PVC plastisol etc.

Among these polymeric matrices, semi-crystalline polyamides, such as polyamide 6, polyamide 6.6, polyamide 11, polyamide 12, polyamide 4, polyamides 4-6, 6-10, 6-12, 6-36, 12-12, semi-aromatic polyamides obtained from terephthalic and/or isophthalic acid such as the polyamide marketed under the trade name AMODEL; polyesters such as PET, PBT and PTT; polyolefins such as polypropylene and polyethylene; aromatic polyamides, the imide polyamides or polyimides; latexes such as acrylic and urethane latexes; PVC, viscose, cellulose, cellulose acetate; and copolymers and alloys thereof are quite particularly preferred.

The compositions can contain all the other additives capable of being used, for example reinforcing agents, fire retardants, UV and heat stabilizers, and matting agents such as titanium dioxide.

The compositions according to the invention are preferably obtained by mixing the thermoplastic polymer and the modified polyamide in the melted phase. The mixing can for example be effected by means of an extrusion device, for example a single screw or twin screw mixer.

The proportion by weight of modified polyamide in the composition advantageously lies between 1 and 99%, preferably between 5 and 30%.

The compositions according to the invention can be utilized as the starting material in the industrial plastics field, for example for the production of articles molded by injection or by injection/blow-molding, extruded by standard extrusion or by blow-molding extrusion, or of films.

The compositions according to the invention can also be formed into yarns, fibers or filaments by melt spinning.

Other details or advantages of the invention will appear more clearly on inspection of the examples given below.

EXAMPLES

Contents of terminal acid (GTC) and amine (GTA) groups: assayed by potentiometry, expressed in meq/kg.

Content of terminal sulfonate (GTS) groups: calculated from the quantities of reagents introduced into the polymerization reactor.

Number average molecular weight Mn determined by the formula $Mn=2.10^6/(GTA+GTC+GTS)$ and expressed in g/mol.

The sulfonate chain end number per chain is calculated in the following manner: sulfonate number/chain=GTS/((GTA+GTC+GTS)/2).

Melting point ($T_f$) and associated enthalpy ($\Delta Hf$), crystallization temperature on cooling ($T_c$): determined by differential scanning calorimetry (DSC), by means of a Perkin Elmer Pyris 1 instrument, at a speed of 10° C./min.

Glass transition temperature ($T_g$) determined on the same instrument at a speed of 40° C./min.

Comparative Example 1

Unmodified PA 66

Into a polymerization reactor are introduced 92.6 kg (353 mol) of N salt (1:1 salt of hexamethylenediamine and adipic acid), 84 kg of demineralized water and 6.4 g of Silcolapse 5020® antifoaming agent.

The polyamide 66 is produced by a standard polymerization method of the polyamide 66 type, with 30 minutes of finishing.

The polymer obtained is cast under a pressure of 5 bars in rod form, cooled and made into granule form by chopping the rods. About 70 kg of polymer is recovered.

The polymer obtained displays the following characteristics: mid-casting, GTC=70.2 meq/kg, GTA=51.5 meq/kg, Mn=16,430 g/mol.

The polyamide 66 is semi-crystalline and has the following thermal characteristics: Tg=70.6° C., Tc=230.9° C., Tf=263.7° C., $\Delta Hf$=68.4 J/g.

Example 1

Preparation of a Polyamide 66 Containing 5 Mole % of SBA

Into a polymerization reactor are introduced 87.2 kg (332.5 mol) of N salt (1:1 salt of hexamethylenediamine and adipic acid), 4057 g of 96.7% sodium 3-carboxybenzenesulfonate (SBA) (17.5 mol), 3398 g of a solution of hexamethylenediamine (HMD) in 32.48% by weight solution in water (9.5 mol) and 83 kg of demineralized water and 6.4 g of Silcolapse 5020® antifoaming agent. The molar content of sulfonate compound is equal to 17.5/(332.5+9.5)=5%.

The polyamide containing 5 mole % of SBA is produced by a standard polymerization method of the polyamide 66 type, with 40 minutes of finishing under a vacuum of 70 mbar.

The polymer obtained is cast under a slight pressure of 1.7 bars in rod form, cooled and made into granule form by chopping the rods. 75 kg of granules are recovered versus 70 kg for comparative example 1, and this for a considerably lower casting pressure, which shows that the polyamide of the invention has greater fluidity.

The polymer obtained displays the following characteristics: mid-casting, GTC=51.1 meq/kg, GTA=44.1 meq/kg, GTS=219 meq/kg, Mn=6,370 g/mol. The chain end sulfonate number per chain is on average 1.4.

The polyamide obtained is semi-crystalline and has the following thermal characteristics: Tg=86.5° C., Tc=228.2° C., Tf=259.5° C., $\Delta Hf$=71.2 J/g. The sulfonate terminated polyamide, in spite of a lower molar mass, has a Tg considerably higher by about 16° C. compared to that of the PA 66.

Example 2

Preparation of a Polyamide 66 Containing 10 Mole % of SBA

Into a polymerization reactor are introduced 132.77 g (0.506 mol) of N salt (1:1 salt of hexamethylenediamine and adipic acid), 12.73 g of 99% sodium 3-carboxybenzenesulfonate (SBA) (0.056 mol), 12.20 g of a solution of hexamethylenediamine (HMD) in 32.25% by weight solution in water (0.034 mol) and 127 g of demineralized water and 2 g of antifoaming agent. The molar content of sulfonate compound is equal to 0.056/(0.506+0.034)=10%.

The polyamide containing 10 mole % of SBA is produced by a standard polymerization method of the polyamide 66 type, with 30 minutes of finishing under a vacuum of about 10 mbar.

The polymer obtained is cast on a tray, with a very slight pressure of 1.2 bar.

The polymer obtained displays the following characteristics: GTC=108.7 meq/kg, GTA=98.3 meq/kg, GTS=435 meq/kg, Mn=3120 g/mol. The chain end sulfonate number per chain is on average 1.36.

The polyamide obtained is semi-crystalline and has the following thermal characteristics: Tg=97.8° C., Tc=213.7° C., Tf=251.8° C., $\Delta Hf$=63 J/g. The sulfonate terminated polyamide, in spite of a lower molar mass, has a Tg considerably higher by about 27° C. compared to that of the PA 66.

Example 3

Preparation of a Polyamide 66 Containing 22 Mole % of SBA

Into a polymerization reactor are introduced 116.64 g (0.445 mol) of N salt (1:1 salt of hexamethylenediamine and adipic acid), 25.17 g of 99% sodium 3-carboxybenzenesulfonate (SBA) (0.111 mol), 20.81 g of a solution of hexamethylenediamine (HMD) in 32.25% by weight solution in water (0.058 mol) and 120.6 g of demineralized water and 2 g of antifoaming agent. The molar content of sulfonate compound is equal to 0.111/(0.445+0.058)=22%.

The polyamide containing 20 mole % of SBA is produced by a standard polymerization method of the polyamide 66 type, with 30 minutes of finishing under a vacuum of about 30 mbar.

The polymer obtained is cast on a tray, with a very slight pressure of 1.2 bar.

The polymer obtained displays the following characteristics: GTC=232.4 meq/kg, GTA=203.5 meq/kg, GTS=855 meq/kg, Mn=1550 g/mol. The chain end sulfonate number per chain is on average 1.32.

The polyamide obtained is semi-crystalline and has the following thermal characteristics: Tg=105.7° C., Tc=183.2° C., Tf=239.6° C., $\Delta Hf$=45 J/g. The sulfonate terminated polyamide, in spite of a lower molar mass, has a Tg considerably higher by about 35° C. compared to that of the PA 66.

Example 4

Preparation of a PA 6 Containing 5 Mole % of SBA

Into a polymerization reactor are introduced 133.18 g (1.177 mol) of caprolactam, 13.9678 g of 99% sodium 3-carboxybenzenesulfonate (SBA) (0.062 mol), 11.031 g of a solution of hexamethylenediamine (HMD) in 32.5% by weight solution in water (0.031 mol) and 64.7 g of demineralized water and 2 g of antifoaming agent. The molar content of sulfonate compound is equal to 0.062/(1.177+0.031)=5%.

The polyamide 6 containing 5 mole % of SBA is produced by a standard polymerization method of type polyamide 6, with 60 minutes of finishing at atmospheric pressure.

The polymer obtained is cast on a tray with a very slight pressure of 1,2 bar. It is then washed 3 times in hot water to remove the residual monomers and oligomers.

The polyamide obtained is semi-crystalline and has the following thermal characteristics: Tg=77.3° C., Tc=165.5° C., Tf=207.2° C., ΔHf=65 J/g. The polyamide 6 containing 5 mole % of SBA has a Tg considerably higher by about 20° C. compared to that of an unmodified PA 6 (Tg=57.5° C.).

Comparative Example 5

Preparation of an Acetic Acid Terminated Polyamide 66

Into a polymerization reactor are introduced 90.75 kg (345.93 mol) of N salt (1:1 salt of hexamethylenediamine and adipic acid), 939 g of 100% acetic acid (15.65 mol), 3.05 kg of a solution of hexamethylenediamine (HMD) in 32.60% by weight solution in water (8.56 mol) and 83.5 kg of demineralized water and 6.4 g of Silcolapse 5020® antifoaming agent.

The acetic acid blocked polyamide 66 is produced by a standard polymerization method of the polyamide 66 type, with 30 minutes of finishing. The polymer obtained is cast in rod form, cooled and made into granule form by chopping the rods.

The polymer obtained displays the following characteristics: GTC=59.9 meq/kg, GTA=65.7 meq/kg and GTB=196 meq/kg (GTB=blocked terminal groups, in this case by acetic acid), Mn=2.10$^6$/(GTA+GTC+GTB)=6,200 g/mol. Its VI=56.2 mL/g. The copolyamide is semi-crystalline and has the following thermal characteristics: Tc=232.3° C., Tf=263.1° C., ΔHf=74.5 J/g.

Example 6

Measurement of Thermomechanical Properties

The elastic modulus E' at different temperatures is measured by mechanical analysis against temperature, on injected test pieces of polymer of comparative example 1 and the polymer of example 1 according to the invention and shown in table 1 below:

TABLE 1

| Polymer | Modulus E' at −20° C. (GPa) | Modulus E' at 25° C. (GPa) | Melt viscosity at 280° C. and 50 s−1 (Pa · s) |
|---|---|---|---|
| Comparative Example 1 | 2.4 | 1.0 | 125 |
| Example 1 | 2.8 | 1.3 | 12.8 |

Example 7

Measurement of the Degree of Crystallinity

The degree of crystallinity was compared between a polyamide according to the invention and a polyamide modified by a difunctional monosulfonated compound (AlSNa). It is observed that the polyamide of example 1 displays a degree of crystallinity of 37.9% while a polyamide 66 modified by 5 mole % of AlSNa (produced under the same conditions) displays a degree of crystallinity of 28.9%; which indicates a decrease in the elastic modulus at all temperatures.

Example 8

Injection Molding

The polymers of example 1 and comparative example 5 displaying similar molecular masses Mn were used in a standard injection molding process. It is found that the polymer of comparative example 5 cannot be readily injected owing to the fact that its high fluidity results in an overflow of the melted material from the mold into the molding chamber. This distinguishing problem is not encountered with the polyamide of example 1.

The invention claimed is:

1. A polyamide modified by a monofunctional sulfonate compound chemically bonded to the polymer chain, the polyamide comprising at least one unit comprising a sulfonate group of formula (I):

-L-Z-A-Y—SO$_3$X    (I)

wherein:
SO$_3$X represents SO$_3$H or SO$_3$M, M is a group which replaces the proto H+ of SO$_3$H to form an inactive salified group,
-L-Z— is a radical derived from condensation of two reactive functional groups F$_1$ and F$_2$ such that,
F$_1$ is the precursor of the radical -L- and F$_2$ the precursor of the radical —Z—,
A is a covalent bond or an aliphatic hydrocarbon radical optionally containing hetero atoms and containing from 1 to 20 carbon atoms, and
Y is a linear or cyclic, aromatic or aliphatic hydrocarbon radical containing at least 2 carbon atoms and optionally containing hetero atoms,
said units being present in a proportion at least equal to 5 mole % relative to the total number of moles of units constituting the polymeric chain, and
wherein the monofunctional sulfonate compound is a monofunctional aromatic compound of formula (II):

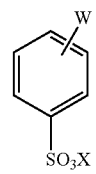
(II)

wherein:
SO$_3$X is as defined above,
—W being -A-F$_2$ with A as defined above, and
F$_2$ being selected from the group consisting of —COHal, —COOR, anhydride, —CONRR', —CO—R, —NRR', —N═C═O, —OR, —NR—CO—NR'R", —O—CO—OR, —O—CO—NRR', —NR—CO—OR', and —SR, wherein Hal is a halogen and wherein R, R' and R", are the same or different, and are a hydrogen atom or a linear or branched alkyl radical containing from 1 to 18 carbon atoms.

2. The modified polyamide as claimed in claim 1, wherein said units are present in a proportion at least equal to 5 mole % relative to the total number of moles of carboxylic diacid units or of diamine units, and/or of aminocarboxylic acid units in the polymeric chain.

3. The modified polyamide as claimed in claim 1, wherein M is selected from the alkali and alkaline earth metals.

4. The modified polyamide as claimed in claim 1, wherein the monofunctional aromatic compound is sodium-3-carboxybenzenesulfonate.

5. A method for preparation of the modified polyamide as claimed in claim 1, the method comprising introducing a monofunctional aromatic compound of formula (II) into a polymerization medium in a melted state, wherein the functional group can react with an amine or acid functional group.

6. The method as claimed in claim 5, wherein polymerization of the following monomers is conducted in the melted state:
A) at least one monofunctional compound comprising a sulfonate group, wherein the functional group can react with an amine or acid functional group, and
B) at least one compound or a mixture of compounds selected from:
B1) a mixture of diacid and diamine, and
B2) a lactam or an amino acid, the molar proportion of monomers A) relative to the monomers B) is at least equal to 5%.

7. The method for preparation of the modified polyamide as claimed in claim 5, wherein a stoichiometric proportion of acid functional groups and amine functional groups contributed by monomers is introduced into the polymerization medium.

8. A thermoplastic polymer composition comprising:
a. the modified polyamide as claimed in claim 1; and
b. a thermoplastic polymer.

9. The thermoplastic polymer composition as claimed in claim 8, wherein the proportion by weight of modified polyamide in the composition is between 5% and 30%.

10. An article obtained by shaping the polyamide as claimed in claim 1 by molding, injection molding, injection/blow-molding, extrusion/blow-molding, extrusion, spinning or film production.

11. The modified polyamide as claimed in claim 1, wherein R is an alkyl radical with 1 to 4 carbon atoms.

12. A thermoplastic polymer composition comprising:
a. the modified polyamide obtained by the method as claimed in claim 5; and
b. a thermoplastic polymer.

* * * * *